United States Patent [19]

Kougioumoutzakis

[11] 4,440,734
[45] Apr. 3, 1984

[54] PROCESS FOR THE RECOVERY OF SULFURIC ACID

[75] Inventor: Demetre Kougioumoutzakis, Ste-Foy, Canada

[73] Assignee: Gouvernement du Quebec, Quebec, Canada

[21] Appl. No.: 347,785

[22] Filed: Feb. 11, 1982

[30] Foreign Application Priority Data

Mar. 24, 1981 [CA] Canada .................................. 373743

[51] Int. Cl.$^3$ ...................... C01C 1/242; C01B 17/90
[52] U.S. Cl. .................................... 423/549; 423/522; 423/531; 423/DIG. 2
[58] Field of Search ............... 423/522, 523, 527, 531, 423/549, DIG. 2

[56] References Cited

U.S. PATENT DOCUMENTS

| | | | |
|---|---|---|---|
| 3,333,924 | 8/1957 | Hazen et al. | 423/531 |
| 3,870,060 | 3/1975 | Liljenzin et al. | 423/531 |
| 4,082,832 | 4/1978 | Watanabe | 423/531 |
| 4,211,761 | 7/1980 | Tung | 423/243 |
| 4,285,924 | 8/1981 | Pratt | 423/531 |
| 4,291,007 | 9/1981 | Baniel | 423/531 |

FOREIGN PATENT DOCUMENTS

| | | | |
|---|---|---|---|
| 686383 | 5/1964 | Canada | 423/390 |
| 514769 | 8/1977 | U.S.S.R. | 423/527 |
| 611877 | 6/1978 | U.S.S.R. | 423/522 |

*Primary Examiner*—Gary P. Straub
*Attorney, Agent, or Firm*—Oblon, Fisher, Spivak, McClelland & Maier

[57] ABSTRACT

The disclosure describes the recovery of sulfuric acid from industrial liquors containing the same. A selective liquid-liquid extraction of said liquors is carried out under conditions producing an organic phase containing the sulfuric acid and an aqueous phase eventually containing impurities. The organic phase is treated with a base, such as gaseous $NH_3$, in order to separate the sulfuric acid. This process is simple, non-polluting, and requires little energy.

16 Claims, No Drawings

PROCESS FOR THE RECOVERY OF SULFURIC ACID

BACKGROUND OF INVENTION (a) Field of the Invention

The invention relates to a process for the recovery of sulfuric acid. More specifically, this invention is concerned with a process which involves the liquid-liquid extraction of sulfuric acid from waste industrial solutions and the transformation of sulfuric acid into a valuable product. In particular, the invention is directed to the recovery of sulfuric acid from waste acids produced in the industry of $TiO_2$ pigments.

(b) Description of Prior Art

The major part of the sulfuric acid which is produced in the world is used as a reagent in various industrial processes. The main users of sulfuric acid are the chemical, petroleum, mining, metallurgical and steel industries. Two important consumers of sulfuric acid in the chemical industry are the fertilizer and pigment industries. At the end of many of these processes, the sulfuric acid is found as waste acid which is contaminated with other substances (organic impurities, metal sulfates, etc.) or as by-product ($CaSO_4$).

The recovery of sulfuric acid from the processes which are used by such industries presents a problem which has not yet found a convenient solution.

At present, various methods are used for the recovery of the sulfuric acid which originates from the waste acids of such processes, such as:

(1) The regeneration of waste sulfuric acid by decomposition at high temperature ($\sim 1000°$ C.) to $SO_2$, reoxidation to $SO_3$, and absorption in water. The regenerated acid contains 93–95% $H_2SO_4$ (Sander, U. and Daradimas, G., Chem. Ing. Progr., Sept. 1978; Regenerating Spent Acid; p. 57–67).

(2) The Simonson-Mantius process (Burke, J. F., and E. Mantius, Chem. Eng. Progr., 43,237 (1947); Duecker, W. W., and J. R. West, eds., "The Manufacture of Sulfuric Acid", p. 238, Reinhold, N.Y. (1959) which recovers waste sulfuric acid by evaporation under vacuum.

(3) The Chemico process (G. M. Smith and E. Mantius, Chem. Eng. Progr. pp. 78–83, (Sept. 1978) which concentrates the waste sulfuric acid by utilizing hot gases.

The disadvantages which are common to these recovery processes are the large quantity of energy consumed and the corrosion which is caused by the high concentration of regenerated acid.

In the case where the recovery of sulfuric acid is not profitable because of the low concentration of $H_2SO_4$ in the waste acid or because of the high percentage of impurities, lime or limestone are used to neutralize the waste acid. The $CaSO_4$ obtained by neutralization often contains impurities which make it unacceptable as gypsum. In this case, the $CaSO_4$ presents a problem because it has to be eliminated.

For the large majority of industries which use sulfuric acid in their processes, the disposal of waste acid constitutes a serious problem because of the regulations governing environmental protection. By way of example, an important process in the pigment industry uses sulfuric acid in order to solubilize $TiO_2$ from raw material. At the end of this process a solution is rejected which contains mainly 250–350 g/l $H_2SO_4$ and, for example, $\sim 7$ g/l $TiO_2$, $\sim 3$ g/l $VOSO_4$ and 22 g/l $Al_2(SO_4)_3$. This solution is discharged directly to a river, constituting a serious source of pollution.

Another example is the process for leaching calcined zinc sulfide with sulfuric acid and electrolyzing the sulfate solution to recover zinc. An important waste solution derived from this process contains about 250 g/l $H_2SO_4$, 13 g/l dissolved Zn and 10 g/l dissolved Mn. These examples are not exhaustive.

SUMMARY OF INVENTION

It is an object of the invention to provide a practical and economical process for the extraction of sulfuric acid from waste industrial solutions.

Another object of the invention consists in providing a functional and practical process for the recovery of sulfuric acid from solutions such as mentioned above, and for converting the recovered acid into a valuable product.

According to the invention, the recovery of sulfuric acid from liquors containing the same is carried out by a selective liquid-liquid extraction of said liquors, under conditions producing an organic phase containing sulfuric acid and an aqueous phase eventually containing impurities. The organic phase is then treated with a base in order to separate the sulfuric acid.

In other words, the solution containing sulfuric acid is subjected, preferably at room temperature, to a process for extraction by means of solvents. An organic solvent is preferably used, such as one which contains a tertiary amine, optionally a modifier and an organic diluent.

The starting liquids are for example waste industrial solutions containing sulfuric acid, such as waste acids obtained in the $TiO_2$ pigments industry.

The waste industrial solutions containing sulfuric acid may contain metallic ions, such as vanadium, iron, titanium, aluminum and chromium.

Even though the nature of the tertiary amine can vary substantially, it is recommended that it be soluble in organic, aromatic or aliphatic solvents, that it be practically insoluble in aqueous media, and that it be capable of extracting sulfuric acid and of easily releasing the latter. The preferred amine includes a macromolecular tertiary amine containing three aliphatic chains, which may or may not be saturated, linear or branched and contains 8 to 12 carbon atoms per chain. Examples of such tertiary amines include the following amines: Alamine 304*, Alamine 308 ®, Alamine 310 ® and Alamine 336°. Alamine 304 ®, is a trilaurylamine; ALAMINE 308 ®, is a triisooctylamine; ALAMINE 310 ®, is a triisodecylamine; ALAMINE 336 ®, is a symmetrical straight chain saturated tertiary amine, the alkyl groups being a 8–10C mixture with the C8 chain predominating.

The organic diluent can vary to a large extent, however, a kerosene such as Solvesso ® is preferred.

With respect to the modifier, it is intended to prevent the formation of emulsion and to ease the separation of the phases. Preferred modifiers include isodecanol, nonylphenol and tributyl phosphate (TBP) preferably at a concentration of about 5 v/o (volume percent).

The sulfuric acid which is extracted with the organic phase is neutralized with a base, such as gaseous $NH_3$, in which case it is recovered by filtration as $(NH_4)_2SO_4$ After neutralization of the sulfuric acid with gaseous $NH_3$, the organic phase can be recycled in order to extract new quantities of sulfuric acid.

When gaseous $NH_3$ is used, it is preferably bubbled through the organic phase in a stoichiometric amount for the neutralization of the sulfuric acid present in this phase and for the production of solid $(NH_4)_2SO_4$ which is thereafter recovered by filtration. The neutralization of the sulfuric acid can also be carried out by treating the organic phase with gaseous $NH_3$ under pressure in a pressure wheel (autoclave). This operation completely withdraws the sulfuric acid from the organic phase which is recycled to extract other quantities of sulfuric acid.

Even though the time needed for the liquid-liquid extraction is not critical, it is generally carried out during a period which varies between 0.1 and 5 minutes.

The recovery of sulfuric acid is normally carried out at room temperature.

DESCRIPTION OF PREFERRED EMBODIMENTS

A typical example of a starting liquor appears in Table I herein below:

TABLE I

| | |
|---|---|
| $V_2O_5$ | 1.3 g/l |
| $FE_{tot}$ | 16.4 g/l |
| $TiO_2$ | 1.7 g/l |
| $Al_2O_3$ | 9.4 g/l |
| $Cr_2O_3$ | 0.36 g/l |
| $H_2SO_4$ | 350 g/l |

An example of an organic solvent comprises 30 v/o tertiary amine and 70 v/o modified kerosene.

According to another embodiment of the invention, the concentration of amine in the diluent can vary between 10 and 60 v/o, and the modifier can be used at a concentration of about 5 v/o.

Even though the pH is not critical, it is recommended that the liquid-liquid extraction be carried out at a pH lower than that which causes precipitation of metal ions present in the solution.

According to another preferred embodiment of the invention, the recovery of sulfuric acid from waste acids derived from the $TiO_2$ pigment industry, containing sulfuric acid and the following metallic ions: vanadium, iron, titanium, aluminum and chromium, is characterized by the fact that these acids are mixed with a solvent containing 30 v/o Alamine 308 ®, 65 v/o Solvesso 150 ®, which is a kerosene composed of >95% aromatic hydrocarbons and >5% saturated hydrocarbons, and 5 v/o isodecanol, during about 5 minutes at room temperature, so as to result in a separation into an aqueous phase containing practically all the metallic ions of the original solution, and an organic phase containing an important portion of the sulfuric acid, gaseous $NH_3$ is bubbled through the organic phase in a stoichiometric quantity to precipitate the $(NH_4)_2SO_4$ which is insoluble in the solvent and the $(NH_4)_2SO_4$ is separated by filtration.

The process is cyclic, selective for the extraction of $H_2SO_4$ and requires only a minimum quantity of energy. The commercial amines, Alamine 304 ®, 308 ®, 310 ® and 336 ® have been used. However, other macromolecular tertiary amines, containing three aliphatic chains, which are saturated or unsaturated, linear or branched and containing 8-12 carbon atoms per chain, can also be used.

The waste sulfuric acid containing metallic ions is contacted with the solvent, such as a solution of amine, by utilizing apparatus known for liquid-liquid extraction (separating funnels, mixers-settlers, extraction columns, centrifuging apparatus, etc.). The sulfuric acid is selectively extracted by the solution of amine without extracting the metallic ions.

The examples which follow are given by way of illustration and are in no way limiting.

EXAMPLE 1

| Composition of solvent: | Alamine 308* | 30 v/o |
|---|---|---|
| | Solvesso 150* (diluent) | 65 v/o |
| | Isodecanol (modifier) | 5 v/o |

*Trademark 1000 ml of waste acid containing 350 g/l $H_2SO_4$, 1.3 g/l $V_2O_5$, 16.4 g/l Fe, 1.7 g/l $TiO_2$, 9.4 g/l $Al_2O_3$ and 0.36 g/l $Cr_2O_3$ were mixed during 5 minutes at room temperature in a separating funnel with 1000 ml of the abovementioned solvent, by using an appropriate agitator ("Wrist Action Shaker"). The separation of the phases required 5 minutes. The concentrations of sulfuric acid after contacting the waste acid with the solvent are 300 g/l in the raffinate and 50 g/l in the organic phase. The concentrations of the metals in the aqueous phase are the following: 1.3 g/l $V_2O_5$, 16.7 g/l Fe, 1.74 g/l $TiO_2$, 9.7 g/l $Al_2O_3$ and 0.37 g/l $Cr_2O_3$, indicating that there is practically no extraction of these elements in the solvent.

If the experiment is repeated using a volume of solvent which is six times that of the waste sulfuric acid, the raffinate has a concentration of 90 g/l $H_2SO_4$, the remaining sulfuric acid (260 g) being extracted by the solvent. Gaseous $NH_3$ was bubbled in stoichiometric quantity into the solvent which contained the sulfuric acid and there was obtained a precipitate of $(NH_4)_2SO_4$ which was insoluble in the solvent. The latter was separated from the solvent by filtration under vacuum and after drying at 105° C. during 1 hour the weight was 67 g. The regenerated solvent was used for the extraction of new quantities of $H_2SO_4$ from waste acid by following the same procedure.

EXAMPLE 2

This example establishes that the overall kinetics of the extraction of sulfuric acid with the solvent is very rapid, which enables to substantially decrease the time of contact during the extraction.

| Composition of solvent: Same as in Example 1. Composition of waste acid: Same as in Example 1. | | |
|---|---|---|
| Contact Time in minutes | Ratio organic phase/ aqueous phase | $H_2SO_4$ concentration in the solvent g/l |
| 0.1 | 1/1 | 53 |
| 0.5 | 1/1 | 53 |
| 0.5 | 4/1 | 53 |
| 1.0 | 1/1 | 53 |
| 1.0 | 6/1 | 53 |
| 2.0 | 1/1 | 53 |
| 3.0 | 1/1 | 53 |
| 5.0 | 1/1 | 53 |

The contact time of Example 1 can be reduced to 1 minute or less, which is a considerable advantage for this process because the size of the extraction apparatus can be considerably reduced.

The examples which follow are based on tests which are made with a solution supplied by the titanium pigment industry, for which an analysis is given in Table 1. The amines used, Solvesso 150 ®, TBP and nonylphenol are products which are readily available on the market. The other reagents are products used in the laboratory and are of reagent grade.

The extraction and stripping tests were made in separating funnels, mechanically agitated with the apparatus, "Wrist Action Shaker" (Barrel Corporation). The temperature was 22°-23° C. The free sulfuric acid in the aqueous phase was titrated with a standard solution of caustic soda (3N NaOH). The concentration of the acid in the solvent was calculated by difference by titrating the free sulfuric acid in the aqueous phase before and after the liquid-liquid extraction.

The metallic elements in solution were analyzed by atomic absorption or by spectrography.

Table 2 shows the extraction of sulfuric acid with different amines. Table 3 shows the extraction of sulfuric acid using the same amines which also contain a quantity of modifier. Table 4 shows the influence of the concentration of Alamine 308 ® on the extraction of $H_2SO_4$. Table 5 presents the kinetics of the extraction by means of Alamine 308 ® and Table 6 provides an analysis of the $(NH_4)_2SO_4$ obtained.

TABLE 2

Extraction of $H_2SO_4$ with different amines (without modifier), at O/A = 1
Time of contact: 5 minutes

| Ex. No. | 30 v/o amine 70 v/o Solvesso 150* | Time of separation of phases, minutes | Formation of emulsion | Extracted $H_2SO_4$ g/l |
|---|---|---|---|---|
| 3 | Alamine 304* | 45 | yes | 28 |
| 4 | Alamine 308* | 5 | no | 49 |
| 5 | Alamine 310* | 10 | yes | 40.6 |
| 6 | Alamine 336* | 10 | no | 49 |
| 7 | Aliquat 336* tricaprylyl methyl-ammonium chloride | 45 | yes | 23.8 |

*Trademark

TABLE 3

Extraction of $H_2SO_4$ with different amines containing a modifier, at O/A = 1
Time of contact: 5 minutes

| Ex. No. | 30 v/o amine 65 v/o Solvesso 150* 5 v/o nonylphenol | Time of separation of phases, minutes | Formation of emulsion | Extracted $H_2SO_4$, g/l |
|---|---|---|---|---|
| 8 | Alamine 304* | 45 | yes | 32.2 |
| 9 | Alamine 308* | 7 | light | 54.6 |
| 10 | Alamine 310* | 7 | yes | 43.4 |
| 11 | Alamine 336* | 4 | light | 49.0 |
| 12 | Aliquat 336* | 5 | yes | 23.8 |
| | 30 v/o amine 65 v/o Solvesso 150* 5 v/o TBP | | | |
| 13 | Alamine 304* | 45 | yes | 36.4 |
| 14 | Alamine 308* | 3 | light | 53.2 |
| 15 | Alamine 310* | 3 | yes | 46.2 |
| 16 | Alamine 336* | 3 | light | 51.8 |
| 17 | Aliquat 336* | 30 | yes | 22.7 |
| | 30 v/o amine 65 v/o Solvesso 150* 5 v/o isodecanol | | | |
| 18 | Alamine 304* | 45 | yes | 33.6 |
| 19 | Alamine 308* | 5 | no | 51.8 |
| 20 | Alamine 310* | 10 | yes | 43.4 |
| 21 | Alamine 336* | 5 | no | 49.0 |
| 22 | Aliquat 336* | 45 | yes | 26.6 |

*Trademark

TABLE 4

Effect of the concentration of the amine of the extraction of $H_2SO_4$ at O/A = 1
Time of contact: 5 minutes

| Ex. No. | Alamine 308* | v/o Solvesso 150* | Isodecanol | Time of separation of phases, minutes | g/l $H_2SO_4$ per 10 v/o Alamine 308* | Total $H_2SO_4$ extracted, g/l |
|---|---|---|---|---|---|---|
| 23 | 10 | 85 | 5 | 1 | 21.0 | 21 |
| 24 | 20 | 75 | 5 | 3 | 18.2 | 36.4 |
| 25 | 30 | 65 | 5 | 5 | 19.1 | 57.3 |
| 26 | 40 | 55 | 5 | 13 | 18.0 | 72 |
| 27 | 50 | 45 | 5 | 23 | 17.6 | 88 |
| 28 | 60 | 35 | 5 | 64 | 17.0 | 102 |

TABLE 5

Kinetics of extraction of $H_2SO_4$ with Alamine 308*
Alamine 308* 30 v/o + Solvesso 150* 65 v/o
+ Isodecanol 5 v/o

| Time of contact, minutes | O/A | Time of separation of phases, minutes | $H_2SO_4$ extracted, g/l |
|---|---|---|---|
| 0.1 | 1 | 6 | 53 |
| 0.5 | 1 | 6 | 53 |
| 1.0 | 1 | 5 | 53 |
| 2.0 | 1 | 5 | 53 |
| 3.0 | 1 | 5 | 53 |
| 5.0 | 1 | 5 | 53 |
| 1.0 | 6 | 5 | 260 |
| 5.0 | 6 | 5 | 260 |

*Trademark

It can therefore be concluded that the time of contact is very short, but not critical.

Alamine 308 ® to which nonylphenol has been added gives a good extraction (54.6 g/l) but the time of separation is relatively long (7 minutes) and the light emulsion formed in the organic phase requires time to break up.

When the nonylphenol is replaced by TBP, the extraction is also good (53.2 g/l), the time of separation of the phases is short (3 minutes) but a light emulsion is present in the organic phase.

Preferably, isodecanol is used which gives an extraction which is between that of Alamine 308 ® and the diluent alone (49 g/l) and the two preceding ones (54.6, 53.2 g/l) and a time of separation of the phases of 5 minutes without formation of an emulsion.

Table 4 shows the effect of the concentration of Alamine 308 ® on the extraction of $H_2SO_4$. The concentration of 30 v/o is preferred because it gives a good extraction of 19.1 g/l $H_2SO_4$ by 10 v/o of solvent while the time of separation is satisfactory (5 minutes). Concentrations higher than 30 v/o increase the viscosity of the solvent and the time of separation.

The kinetics involved in the extraction was also studied briefly and the results are indicated in Table 5. By varying the time of contact from 0.1 to 5.0 minutes, the amount of $H_2SO_4$ extracted is the same, which confirms that the extraction of the acid with the amine is an instantaneous reaction. However, allowance should be made for the minimum time required to physically contact the two liquids. With a ratio of O/A=6, one minute of contact is sufficient to extract the sulfuric acid.

The stripping of the organic phase is preferably carried out with $NH_3$ gas, even though other bases can also be used. The acid is stripped quantitatively from the solvent in the form of solid $(NH_4)_2SO_4$ and then separated by simple liquid-solid filtration. The solvent is thereafter ready to be reused for the extraction of new quantities of acid. The advantage of $NH_3$ gas is that the $(NH_4)_2SO_4$ produced does not contain water, and therefore does not require expensive evaporation to isolate it.

By bubbling $NH_3$ through the organic phase under atmospheric pressure the recovery was 100%.

Under an ammonia pressure of 50 lbs in an autoclave of stainless steel 316, the stripping required less than 3-4 minutes and the yield was 100%. Even shorter retention times are practicable. The precipitate was washed with ether to separate the solvent retained by the salt and this solvent was recovered after evaporation of the ether.

The analysis of $(NH_4)_2SO_4$ produced by the $NH_3$ stripping is presented in Table 6. The purity of the product is at least comparable to that of the product sold on the market as fertilizer.

TABLE 6

| Analyses of $(NH_4)_2SO_4$ | |
|---|---|
| By atomic absorption | |
| $V_2O_5$ | 0.002% |
| Fe | 0.004% |
| $TiO_2$ | 0.02% |
| $Al_2O_3$ | 0.002% |
| $Cr_2O_3$ | 0.002% |
| Spectro - semi-quantitative | |
| Na, Si | 0.005-0.05% |
| Ca, Fe, Mg, Ti | 0.001-0.01% |
| Al | <0.001% |
| Ag, As, B, Ba, Be, Bi, Nb, Co Cu, Li, Mn, Mo, Ni, P, Pb, Sb, Sn, Sr, Zn, W | not detected |
| Diffraction-X | |
| $(NH_4)_2SO_4$ with traces of $NH_4Cl$ | |

The process according to the invention is relatively simple and does not require equipment which is sophisticated and costly. There is need for only a mixer-settler, columns for the stripping of the sulfuric acid as $(NH_4)_2SO_4$ and a standard filter.

It should be noted that the process does not require thermal energy.

The process according to the invention uses solvents which are readily available on the market, such as macromolecular tertiary amines having chains containing 8-12 carbon atoms, said chains being aliphatic, linear or branched, saturated or unsaturated; these solvents are diluted in an organic, aromatic or aliphatic solvent which contains a modifier (macromolecular alcohol).

The duration of the extraction is very interesting, extremely brief, being of the order of 1 minute or less.

The solvent is completely regenerated after stripping the sulfuric acid, which enables it to be recycled and thus provides economic advantages. The process according to the invention complies with environmental regulations. It leads to a solid product and does not produce water, avoiding costly evaporation. The extraction and recovery of the sulfuric acid are carried out at room temperature. The process requires only a minimum of energy.

I claim:

1. A process for selectively separating sulfuric acid from liquors containing sulfuric acid and impurities comprising a plurality of metallic ions, which comprises treating by liquid-liquid extraction of said liquors with an organic solvent consisting essentially of tri-isooctylamine, kerosene, and isodecanol under conditions effective to provide a selective liquid-liquid extraction of said liquors to give an organic phase containing the extracted sulfuric acid and substantially no metallic ions, and an aqueous phase containing substantially all said plurality of metallic ions, separating said organic and said aqueous phase, regenerating said organic phase by introducing gaseous $NH_3$ therein under conditions to form solid $(NH_4)_2SO_4$, and separating said solid $(NH_4)_2SO_4$ from said organic phase thereby regenerating said organic solvent including said tri-isooctylamine, kerosene and isodecanol.

2. Process according to claim 1, wherein said liquors comprise waste industrial solutions containing sulphuric acid.

3. Process according to claim 2, wherein the waste industrial solutions containing sulphuric acid are waste acids derived from the industry of $TiO_2$ pigments.

4. Process according to claim 1, wherein the metal ions comprise vanadium, iron, titanium, aluminum and chromium.

5. Process according to claim 1, wherein after stripping of the sulfuric acid with $NH_3$ gas, the organic solvent is recycled in order to extract new quantities of sulfuric acid.

6. Process according to claim 1, wherein the aqueous and organic phases are separated by decanting the organic phase.

7. Process according to claim 1, wherein the $NH_3$ gas is bubbled into the organic phase in a stoichiometric quantity to neutralize the sulfuric acid present in this phase and to form solid $(NH_4)_2SO_4$ which is recovered by filtration.

8. Process according to claim 1, wherein the stripping of sulfuric acid is carried out by treating the organic phase with $NH_3$ gas, under pressure in an autoclave.

9. Process according to claim 1, wherein the liquid-liquid extraction is carried out during a period of time between 0.1 and 5 minutes.

10. Process according to claim 1, wherein the extraction and stripping are carried out at room temperature.

11. Process according to claim 1, wherein the organic solvent contains 30 volume percent tri-isooctylamine and 70 volume percent kerosene isodecanol.

12. Process according to claim 1, wherein the concentration of amine in the solvent varies between 10 and 60 volume percent.

13. Process according to claim 1, wherein the isodecanol is used at a concentration of about 5 volume percent.

14. Process according to claim 1, wherein the liquid-liquid extraction is carried out at a pH lower than the pH at which metals present in the form of ions in the solution are precipitated.

15. Process of recovering sulfuric acid from waste acids derived from the $TiO_2$ pigments industry, containing sulfuric acid, and vanadium, iron, titanium, aluminum and chromium ions, wherein said waste acids are mixed with a solvent containing 30 volume percent tri-isooctylamine 65 volume percent Kerosene and 5 volume percent isodecanol, during about 5 minutes or less at room temperature, at a pH lower than the pH which precipitates said ions, so as to provide a separation into an aqueous phase containing substantially all the metal ions from the orginial solution, and an organic phase containing an important portion of the sulfuric acid, bubbling $NH_3$ gas through said organic phase in a stoichiometric quantity to precipitate $(NH_4)_2SO_4$ which is insoluble in the solvent, separating $(NH_4)_2SO_4$ by filtration, and recycling said organic solvent.

16. Process according to claim 1, wherein said solid $(NH_4)_2SO_4$ is separated by filtration.

* * * * *